the hypotensive activity of reserpiline, whereas the duration of this activity is longer with the compounds according to this invention than with reserpiline.

United States Patent Office 3,104,243
Patented Sept. 17, 1963

3,104,243
ESTERS OF RESERPILIC ACID
Léon Gillo, Brussels, Belgium, assignor to Indalco, S.A., Brussels, Belgium
No Drawing. Filed Sept. 26, 1961, Ser. No. 140,670
Claims priority, application Belgium Sept. 28, 1960
10 Claims. (Cl. 260—294.3)

This invention relates to new derivatives of alkaloids and the preparation thereof. More particularly, the invention concerns new derivatives of reserpiline.

The new derivatives according to this invention may be represented by the following structural formula:

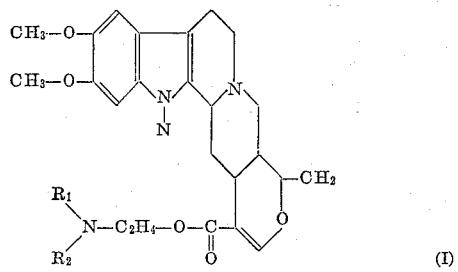

in which $R_1$ and $R_2$ represent lower alkyl radicals containing 1 to 5 carbon atoms.

The new compounds according to this invention are the dialkylaminoethyl esters, preferably the dimethylaminoethyl esters, of reserpilic acid. The acid of dimethylaminoethyl esters is represented by the following structural formula:

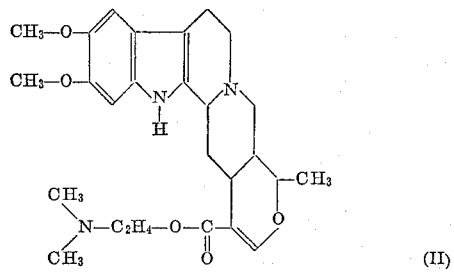

Dimethylaminoethyl ester of reserpilic acid

The invention relates also to acid addition salts of the compounds of Formula I and particularly to the salts of the compound of Formula II with inorganic and organic pharmacologically acceptable acids, such as hydrochloric, sulphuric, oxalic, tartaric acids and the like. Among these salts, the hydrochlorides of the dimethylaminoethyl esters of reserpilic acid may be mentioned.

Tests have shown that the toxicity of the hydrochloride of the dimethylaminoethyl esters of reserpilic acid is much lower than that of reserpine and reserpiline.

Thus, the toxicity ($LD_{100}$) determined by the method of Knafel and Lentz amounts to 15 mg./kg. for reserpine and to 19 mg./kg. for reserpiline, whereas the toxicity of the hydrochloride of the dimethylaminoethyl ester of reserpilic acid amounts to 149 mg./kg.

With regard to the activity on the central nervous system, it has been found to the compounds represented by the Formula I according to this invention are free from neuroleptic effects. It has been found, on the contrary, that these compounds have a slight stimulating effect on the central nervous system. Moreover, it has been found that on the cat which has been treated with chloralose or ether, the compounds represented by Formula I have a hypotensive activity which corresponds nearly to twice the hypotensive activity of reserpiline, whereas the duration of this activity is longer with the compounds according to this invention than with reserpiline.

Contrary to reserpine, the compounds according to this invention are free from ulcerating effects and from exciting effects on the gastric secretion.

Clinical tests on more than fifty patients suffering from hypertension have shown that a decrease of blood pressure from 1 to 4 points has been obtained in more than 65% of the patients. Generally, the disagreeable symptoms associated to hypertension, such as nausea, cramps and so on, are suppressed.

The new compounds have also anti-cholinergic properties.

This invention relates also to a method for the preparation of the new compounds of the Formula I and of the acid addition salts of these compounds, from reserpiline which is represented by the following formula:

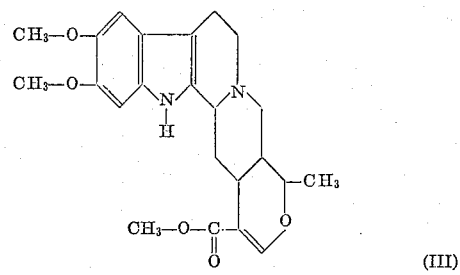

Reserpiline

For the preparation of a compound of the Formula I from reserpiline (III), reserpiline is first converted into reserpilic acid and this acid is then esterified, so as to replace the hydrogen atom of the carboxyl group of the acid by a dialkylaminoethyl group.

The reserpilic acid may be represented by the following formula:

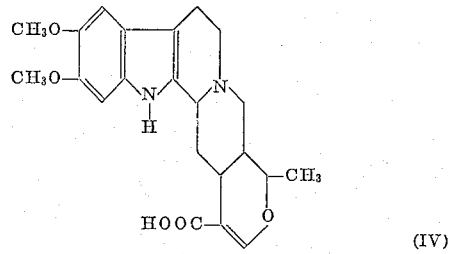

Reserpilic acid

In one embodiment of the method according to this invention, reserpilic acid is esterified by means of a dialkylaminoethanol, preferably dimethylaminoethanol.

In another embodiment of the method according to this invention, reserpilic acid is converted into an alkaline metal salt and the resulting salt is condensed with a halide of a dialkylaminoethane, such as dimethyl aminoethyl chloride.

Reserpiline is converted into reserpilic acid by saponification in an alcoholic medium (methanol, ethanol and the like) or in a hydroalcoholic medium, said acids being precipitated as hydrochloride which are preferably recrystallized from a suitable solvent, such as an alcohol (for example methanol) or a mixture of alcohol and water (for example a mixture of methanol and water).

The free reserpilic acid is obtained by dissolving the hydrochloride in a suitable solvent, such as a mixture of alcohol and water, and by precipitating said acids by means of an alkali at an isoelectric pH.

It is also possible to obtain the free acid by stirring the hydrochloride in an alcoholic medium with an excess of silver carbonate.

The esterification of the reserpilic acid may be effected by condensing an alkaline metal salt of the acid with a halide of a dialkylaminoethane, by removing the formed inorganic salt and by crystallizing the ester as an addition salt with a pharmacologically acceptable acid.

It is also possible to esterify the acid by reacting it with a dialkylaminoethanol, in the presence of a solvent, such as toluene, benzene or xylene, the formed water being removed as an azeotropic mixture with a solvent. The formed ester is precipitated as a salt of addition with a suitable organic or inorganic acid.

A halide of a dialkylaminoethanol may also be reacted with free reserpilic acid, the reaction mixture being refluxed in a alcoholic medium and the formed ester being precipitated as a salt of addition with a suitable inorganic or organic acid.

The new compounds according to this invention may be used in pharmaceutical preparations or compositions for oral and parenteral uses.

This invention relates also to pharmaceutical preparations in solid form (tablets or pills) or in liquid form (drops, syrups or solutions for injection), these preparations containing a compound of the Formula I and a pharmaceutical vehicle.

The dosages of the new compounds to be administrated to patients may vary within wide limits, according to the degree of hypertension. Doses comprised between 15 and 30 mg. per day are generally suitable.

The following examples are given by way of illustration.

EXAMPLE 1

*Preparation of Reserpilic Acid (IV)*

2 g. of reserpiline (III) are refluxed during 4 hours with 100 ml. of methanol and 1 N potassium hydroxide. After cooling, the mixture is neutralized by means of 75 ml. of hydrochloric acid dissolved in methanol (1.6 N solution) and the formed potassium chloride is filtered off. After evaporation to dryness, the residue is extracted by means of 50 ml. of a mixture (3:1) of chloroform and methanol and the residual potassium chloride is filtered off and washed with the same solvent mixture. The filtrate is then evaporated to dryness and the residue is dissolved in a mixture of 20 ml. of methanol and of 100 ml. of water, a diluted solution of caustic soda being finally added so as to obtain a pH of 7.6. The obtained crystals melt at 227–229° C.

After recrystallization in a mixture of methanol and water, the reserpilic acid hydrochloride melts at 245–247° C.

EXAMPLE 2

*Preparation of the Dimethylaminoethylester of Reserpilic Acid (II)*

870 mg. of reserpilic acid (IV) hydrochloride are refluxed during 2 hours with 2.38 ml. of caustic potash (0.84 N), with 250 mg. of dimethylaminoethyl chloride and with 10 ml. of methanol. The reaction mixture is then cooled and filtered. The filter cake is washed twice with 5 ml. of a mixture (1:3) of methanol and chloroform. After evaporation to dryness under vacuum, the residue is dissolved in 10 ml. of isopropanol and 2.5 ml. of a solution (0.84 N) of hydrochloric acid in isopropanol is added. Crystals are obtained in a refrigerator. These crystals are filtered off, dried under vacuum and recrystallized in a mixture (1:5) of methanol and isopropanol.

The obtained dihydrochloride of the dimethylaminoethyl ester of reserpilic acid is a white product which is very soluble in water, moderately soluble in methanol, less soluble in isopropanol and insoluble in ether, benzene and chloroform. M.P. about 271° C.

*Analysis.*—Calculated for $C_{26}H_{37}N_3O_5Cl_2$: Cl=13.7%; N = 7.75%; C = 57.56%; H = 6.87%. Found: Cl=13.05%; N=7.76%; C=57.09%; H=6.98%.

U.V. spectrum in methanol: Max. at 225/227 mu, 299/303 mu; min. at 279/281 mu.

EXAMPLE 3

*Preparation of Diethylaminoethylester of Reserpilic Acid*

The procedure is the same as in Example 2 except that diethylaminoethyl chloride is used in place of dimethylaminoethyl chloride.

EXAMPLE 4

*Pills Containing Dimethylaminoethyl Ester of Reserpilic Acid*

A base for pills is prepared by mixing the following ingredients in the following proportions by weight:

| | |
|---|---|
| Sucrose | 80 |
| Starch | 15 |
| Magnesium stearate | 5 |

To this base is mixed a sufficient quantity of dimethylaminoethyl ester of reserpilic acid for obtaining, after compression, scored pills containing each 7.5 mg. of said ester.

What I claim is:

1. A reserpiline compound of the formula:

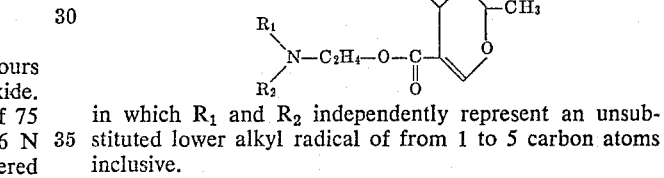

in which $R_1$ and $R_2$ independently represent an unsubstituted lower alkyl radical of from 1 to 5 carbon atoms inclusive.

2. Dimethylaminoethyl ester of reserpilic acid.

3. Dihydrochloride of the dimethylaminoethyl ester of reserpilic acid.

4. Diethylaminoethyl ester of reserpilic acid.

5. Dihydrochloride of the diethylaminoethyl ester of reserpilic acid.

6. A salt of a reserpiline compound of the formula:

in which $R_1$ and $R_2$ independently represent an unsubstituted lower alkyl radical of from 1 to 5 carbon atoms inclusive, with an acid selected from the group consisting of inorganic and organic pharmacologically acceptable acids.

7. A salt according to claim 6 in which the acid is hydrochloric acid.

8. A salt according to claim 6 in which the acid is sulphuric acid.

9. A salt according to claim 6 in which the acid is oxalic acid.

10. A salt according to claim 6 in which the acid is tartaric acid.

References Cited in the file of this patent

UNITED STATES PATENTS 2,995,556    Lucas _____ Aug. 8, 1961

OTHER REFERENCES

Groggins: Unit Processes in Org. Synthesis, McGraw-Hill, New York, 4th Edition (1952), page 598.